US012600839B2

(12) United States Patent
Land Hensdal et al.

(10) Patent No.: US 12,600,839 B2
(45) Date of Patent: Apr. 14, 2026

(54) COMPOSITION, FILM OR COATING COMPRISING MICROFIBRILLATED CELLULOSE AND EXTRACTIVE FROM WOOD BARK OR CORK WOOD

(71) Applicant: Stora Enso OYJ, Helsinki (FI)

(72) Inventors: Cecilia Land Hensdal, Forshaga (SE); Venkata Prabhakar Soudham, Ånge (SE); Kaj Backfolk, Villmanstrand (FI)

(73) Assignee: Stora Enso OYJ, Helsinki (FI)

( * ) Notice: Subject to any disclaimer, the term of this patent is extended or adjusted under 35 U.S.C. 154(b) by 645 days.

(21) Appl. No.: 17/753,798

(22) PCT Filed: Sep. 15, 2020

(86) PCT No.: PCT/IB2020/058547
§ 371 (c)(1),
(2) Date: Mar. 15, 2022

(87) PCT Pub. No.: WO2021/053500
PCT Pub. Date: Mar. 25, 2021

(65) Prior Publication Data
US 2022/0340735 A1 Oct. 27, 2022

(30) Foreign Application Priority Data
Sep. 16, 2019 (SE) .................................... 1951041-1

(51) Int. Cl.

| | |
|---|---|
| *C08L 1/02* | (2006.01) |
| *B65D 65/40* | (2006.01) |
| *B65D 65/46* | (2006.01) |
| *C08J 5/18* | (2006.01) |
| *C09D 7/63* | (2018.01) |
| *C09D 101/02* | (2006.01) |

(52) U.S. Cl.
CPC ............... *C08L 1/02* (2013.01); *B65D 65/40* (2013.01); *B65D 65/466* (2013.01); *C08J 5/18* (2013.01); *C09D 7/63* (2018.01); *C09D 101/02* (2013.01); *C08J 2301/02* (2013.01); *C08J 2429/04* (2013.01); *C08L 2201/06* (2013.01); *C08L 2203/16* (2013.01); *C08L 2205/16* (2013.01)

(58) Field of Classification Search
CPC .... C08L 1/02; C08L 2201/06; C08L 2203/16; C08L 2205/16; C09D 7/63; C09D 101/02; B65D 65/40; B65D 65/466; C08J 5/18; C08J 2301/02; C08J 2429/04
See application file for complete search history.

(56) References Cited

U.S. PATENT DOCUMENTS

| | | | |
|---|---|---|---|
| 11,339,313 B2 | 5/2022 | Horito et al. | |
| 2009/0258971 A1* | 10/2009 | Heiskanen | C08L 51/02 |
| | | | 524/13 |
| 2016/0068668 A1* | 3/2016 | Peltola | B32B 27/34 |
| | | | 521/143 |
| 2016/0215086 A1* | 7/2016 | Moura Bordado | C09J 197/007 |
| 2018/0319135 A1* | 11/2018 | Barzegari | C08L 75/02 |
| 2019/0234020 A1* | 8/2019 | Backfolk | D21H 27/38 |

FOREIGN PATENT DOCUMENTS

| | | |
|---|---|---|
| CN | 101395219 A | 3/2009 |
| CN | 105745256 A | 7/2016 |
| GB | 2448984 A | 11/2008 |
| WO | 2017221137 A1 | 12/2017 |
| WO | 2018083592 A1 | 5/2018 |
| WO | 2018199190 A1 | 11/2018 |
| WO | WO-2020075057 A1 * | 4/2020 ................ C08J 5/18 |

OTHER PUBLICATIONS

Laka et al. ("Effect of extraction of the coatings produced from nanoparticle gels obtained from hardwood and softwood bark" IOP Conf. Ser.: Mater. Sci. Eng. 2019 (published Sep. 12, 2018), 500, 012005) (Year: 2018).*
WO 2020075057 A1 (Year: 2020).*
Huang et al. ("Incorporation of ligno-cellulose nanofibrils and bark extractives in water-based coatings for improved wood protection", Progress in Organic Coatings 2020 (published online Jul. 10, 2019), 138, 105210) (Year: 2019).*
Yan et al. ("Application of Western red cedar (*Thuja plicata*) tree bark as a functional filler in pMDI wood adhesives" Industrial Crops & Products, 2018, 113, p. 1-9) (Year: 2018).*
D. Fengel, Ultrastructural behaviour of cell wall polysaccharides, TAPPI, 1970, vol. 53, No. 3, pp. 497-503 (abstract only).
Gary Chinga-Carrasco, Cellulose fibres, nanofibrils and microfibrils: The morphologial sequence of MFC components from a plant physiology and fibre technology point of view, Chinga-Carrasco Nanoscale Research Letters, 2011, 6:417.

(Continued)

*Primary Examiner* — Travis M Figg
(74) *Attorney, Agent, or Firm* — Greer Burns & Crain Ltd.

(57) ABSTRACT

The present invention is directed to a film or coating comprising a fiber material, wherein at least 60% by weight of said fiber material is microfibrillated cellulose, said film or coating also comprising at least 1% by weight of extractives from wood bark or cork wood. The invention is also directed to products, such as packaging materials, using or incorporating said film or coating. Such packaging materials are for example laminates or multi-layer structures. The films or coatings according to the present invention having advantageous barrier properties and are therefore particularly suitable for sensitive objects that need to be packaged in a controlled or modified atmosphere. The present invention is also directed to a composition comprising a fiber material, wherein at least 60% by weight of said fiber material is microfibrillated cellulose, said composition also comprising at least 1% by weight of extractives from wood bark or cork wood. The composition is useful for example in the preparation of the film or coating.

11 Claims, No Drawings

(56)  References Cited

OTHER PUBLICATIONS

Dongfang Li et al., From forest residues to hydrophobic nanocomposites with high oxygen-barrier properties, Biorefinery, Nordic Pulp & Paper Research Journal, vol. 31, No. (2), 2016.

Marianna Laka et al., Micro-nanoparticle gels obtained from bark for their use alone and with chitosan and Na-CMC in paper coatings, Holzforschung 2015, 69(6): 745-749.

Yanhui Huang et al., Incorporation of ligno-celluose nanofibrils and bark extractives in water-based coatings for improved wood protection, Progress in Organice Coatings 138 (2020), 105210.

International Search report from corresponding PCT application No. PCT/IB2020/058574 mailed on Oct. 22, 2020.

Ligia Maria Manzine Costa et al., Bionanocomposites from electrospun PVA/pineapple nanofibers/Stryphnodendron adstrigens bark extract for medical applications, Industrial Crops and Products 41 (2013) 198-202.

Extended European Search Report from corresponding European application No. EP 20865067.1 dated Sep. 4, 2023.

European office action from corresponding application No. 20865067.1 dated Jun. 20, 2025.

* cited by examiner

COMPOSITION, FILM OR COATING COMPRISING MICROFIBRILLATED CELLULOSE AND EXTRACTIVE FROM WOOD BARK OR CORK WOOD

This application is a U.S. National Phase under 35 U.S.C. § 371 of International Application No. PCT/IB2020/058547, filed Sep. 15, 2020, which claims priority under 35 U.S.C. §§ 119 and 365 to Swedish Application No. 1951041-1 filed Sep. 16, 2019.

TECHNICAL FIELD

The present invention is directed to a film or coating comprising a fiber material, wherein at least 60% by weight of said fiber material is microfibrillated cellulose, said film or coating also comprising at least 1% by weight of extractives from wood bark or cork wood. The invention is also directed to products, such as packaging materials, using or incorporating said film or coating. Such packaging materials are for example laminates or multi-layer structures. The films or coatings according to the present invention having advantageous barrier properties and are therefore particularly suitable for sensitive objects that need to be packaged in a controlled or modified atmosphere. The present invention is also directed to a composition comprising a fiber material, wherein at least 60% by weight of said fiber material is microfibrillated cellulose, said composition also comprising at least 1% by weight of extractives from wood bark or cork wood. The composition is useful for example in the preparation of the film or coating.

BACKGROUND

Packages used for sensitive objects such as food, where a certain composition of the atmosphere needs to be maintained inside the package, are referred to as modified atmosphere packages (MAP) or controlled atmosphere packages (CAP).

Films used in MAP and CAP are usually made from non-renewable plastic materials.

To manufacture a renewable film suitable for use in MAP and/or CAP, several technical problems need to be addressed. Firstly, the gas and moisture permeability of the package needs to be sufficiently low to make the film suitable for use in MAP and CAP. Secondly, the film needs to be sufficiently thin and flexible. Ideally, the film should also be sufficiently resistant to heat.

GB2448984 describes a multi-layer polymeric film comprising a layer of lactic acid homo-polymer (PLA), a layer of polyvinyl alcohol (PVA, PVOH), at least one intermediate adhesive layer comprising a blend of poly(lactic acid) with poly(vinyl alcohol) and/or starch. The PVA may have a layer of PLA or cellulosic material applied to it. The multi-layer film can be used as a package of fresh produce in a controlled atmosphere.

There is a need for a renewable material suitable for use as a film in a MAP and CAP.

Wood bark contains high amounts of extractives, typically 20-40% in dry weight. If selectively removed and recovered, these extractives can be used in various applications.

SUMMARY OF THE INVENTION

It has surprisingly been found that by adding at least one extractive, or a salt thereof, from wood bark or cork wood to a suspension comprising microfibrillated cellulose, a film or coating prepared from said suspension has improved barrier properties, in particular improved water vapor transmission rate.

It is thus an object of the present disclosure to provide a composition comprising a fiber material, wherein at least 60% by weight of said fiber material is microfibrillated cellulose, said composition also comprising at least 1% by weight of at least one extractive, or a salt thereof, from wood bark or cork wood. Preferably, the extractive is suberin, betulin or a salt thereof. The composition may be provided in dry form or as a suspension, such as an aqueous suspension.

It is thus an object of the present disclosure to provide a film or coating having improved barrier properties, in particular improved water vapor transmission rate. The film is suitable for use in the manufacture of a MAP and/or CAP and the film or coating is also useful in the manufacture of a laminate or multi-layer structure wherein improved water vapor transmission rate is desirable.

Thus, the present invention is directed to a coating or film comprising a fiber material, wherein at least 60% by weight of said fiber material is microfibrillated cellulose, said film or coating also comprising at least 1% by weight of at least one extractive, or a salt thereof, from wood bark or cork wood.

In one embodiment, the extractives from wood bark or cork wood are aliphatic or alicyclic extractives. Preferred extractives from wood bark or cork wood include suberin or betulin or a salt thereof.

According to the present invention, a suspension comprising a mixture of the the fiber material, wherein at least 60% by weight of said fiber material is microfibrillated cellulose, is prepared. The fiber material, wherein at least 60% by weight of said fiber material is microfibrillated cellulose, can be prepared according to methods known in the art. The at least one extractive, or a salt thereof, from wood bark or cork wood, is also prepared using methods known in the art, and mixed with the fiber material in the suspension.

The suspension may comprise additional components. In a preferred embodiment, the suspension comprises at least 1% by weight of PVOH, modified PVOH (such as cationic, anionic, ethylated or silanolated PVOH), EVOH, carboxymethylcellulose, or glycerol, more preferably from 1% to 10% by weight of PVOH, modified PVOH (such as cationic, anionic, ethylated or silanolated PVOH), EVOH, carboxymethylcellulose, or glycerol, most preferably from 1% to 10% by weight of PVOH.

A film or coating is produced using said suspension. The film or coating can be prepared according to methods known in the art. For example, a film can be produced by casting or in a paper machine. Coatings can also be prepared according to methods known in the art. A substrate, preferably a fiber-based substrate, such as paper, board, high density paper or glassine paper is provided on which the coating is applied. For example, the coating can be provided onto the substrate using methods know in the art such as conventional dispersion coating with blade or rod, extrusion coating, foam coating, spray coating, curtain coating or by printing.

In one embodiment of the present invention, the film has been coated on at least one side with a coating that enhances gas and/or moisture barrier properties. In one embodiment, the coating that enhances gas and/or moisture barrier properties is a thermoplastic polymer. Alternatively and preferably, the film is instead coated with a coating comprising at least 60% of microfibrillated cellulose but essentially no extractives from wood bark of cork wood. The thickness of the coating, i.e. the coating comprising microfibrillated cellulose but essentially no extractives from wood bark of cork wood, is preferably from 0.05 to 20 μm, and may be provided on one or both sides of the film.

The film according to the present invention may be used as it is, i.e. as a free standing film or pouch, in which case the film is typically gluable, i.e. a pouch can be prepared by gluing the film, essentially in the absence of other layers of components than the film itself.

The film or coating may also form part of a multi-layer structure. The other layers of such a multi-layer structure may be fiber-based or polymer based. For example, the multi-layer structure may comprise board layers, polymer layers or films as well as metal-based or metal-containing layers.

The film described above as well as multi-layer structures incorporating the film or coating are particularly useful as packaging materials. In view of the barrier properties achieved according to the present invention, the films may be used as free-standing films or pouches and for example be used in a modified atmosphere package or a controlled atmosphere package. Further, the film or coating may be useful in packaging materials for food, beverages etc, such as packaging materials for liquids. In such embodiments, the film or coating according to the present invention is part of a multi-layer structure which is typically sealable by heating, i.e. the structure comprises a heat sealable layer such as a layer comprising a thermoplastic polymer. Such structures may also comprise a metal-containing layer such as a layer of aluminium film or foil or a layer in which a small amount of aluminium has been provided using for example atomic layer deposition using methods known in the art.

Thus, one embodiment of the present invention is a modified atmosphere package or controlled atmosphere package comprising a film according to the present invention.

The thickness of the film or coating according to the present invention can be selected depending on the required properties. In a preferred embodiment, the film or coating thickness is 10-1000 μm, such as 10-100 μm or 20-60 μm or 10-50 μm, having a grammage of for example 5-50 g/m$^2$, such as 10-40 g/m$^2$.

The film or coating according to the present invention can be subjected to printing, either separately or after coating or incorporation into a multi-layer structure. The film has mechanical properties such that it is suitable for use in a reel to reel printing process, but can also be subjected to off-line surface treatment with other technologies such as flexogravure, rotogravure, reverse rotogravure, silk screen printing, inkjet printing, offset printing (lithography), spray, curtain, foam or other printing or surface treatment techniques.

In one embodiment of the present invention, the film or coating is biodegradable and/or compostable. In this context, compostability is defined in accordance with ISO 18606, i.e. constituents in the whole material which are present at concentrations of less than 1% do not need to demonstrate biodegradability. However, the sum of such constituents shall not exceed 5%. Biodegradability is defined as follows: the ultimate aerobic biodegradability shall be determined for the whole material or for each organic constituent which is present in the material at a concentration of more than 1% (by dry mass). Constituents present at levels between 1 to 10% shall be tested individually.

DETAILED DESCRIPTION

The microfibrillated cellulose used in the film or coating according to the present invention can be prepared using methods known in the art.

In one embodiment of the present invention, the film is formed in a paper making machine or according to a wet laid production method, by providing a suspension onto a wire and dewatering the web to form an intermediate thin substrate or said film.

The microfibrillated cellulose content of the suspension may, according to one embodiment be in the range of from 60 to 99.9 weight-% based on the weight of solids of the suspension. In one embodiment, the microfibrillated cellulose content of the suspension may be in the range of 70 to 99 weight-%, in the range of 70 to 95 weight-%, or in the range of from 75 to 90 weight-%.

The at least one extractive, or a salt thereof, from wood bark or cork wood, used in the present invention, is preferably suberin, betulin or a salt thereof.

Suberin is a lipophilic macromolecule, a complex polyester built from poly-functional long-chain fatty acids (suberin acids) and glycerol, found in plant materials. Similarly, betulin is an abundant, naturally occurring triterpene—a complex aromatic higher plant macromolecule. Methods for extracting suberin and betulin from wood bark or cork wood are known in the art.

The amount of the at least one extractive is at least 1% by weight of the solids of the suspension. Preferably, the amount of the at least one extractive is from 5% to 30% by weight of the solids of the suspension, more preferably from 10% to 30% by weight of the solids of the suspension. The suspension may comprise one or more such extractive or salt thereof.

Suitable salts of the extractive are for example sodium salts, potassium salts, calcium salts. Preferably, the extractive is provided in salt form.

The suspension used according to the present invention preferably also comprises polyvinyl alcohol (PVOH). Thus, the suspension comprises the fiber material, wherein at least 60% by weight of said fiber material is microfibrillated cellulose as well as the extractive and PVOH. Preferably, the amount of PVOH is at least 1% by weight of the solids of the solids of the suspension, more preferably from 1% to 20% by weight, preferably from 5% to 20% by weight. Preferably, the PVOH has a degree of hydrolysis of at least 88 mol % and a viscosity of at least 5 mPa·s in a 4% aqueous solution at 20° C. DIN 53015/JIS K 6726.

One preferred embodiment of the present invention is a multi-layer structure comprising one layer which is the coating or film according to the present invention, i.e. a coating or film comprising the fiber material, wherein at least 60% by weight of said fiber material is microfibrillated cellulose as well as the at least one extractive and PVOH. The preferred structure also comprises a layer or coating comprising fiber material, wherein at least 60% by weight of said fiber material is microfibrillated cellulose, but which is essentially free from the extractive.

In one embodiment of the present invention, the water vapor transmission rate of the coating or film, measured at a grammage of 10-50 g/m$^2$ and at standard conditions (23° C., 50% RH), is less than 5 cc/m$^2$*day, preferably less than 2 cc/m$^2$*day.

In one embodiment of the present invention, the oxygen transmission rate (OTR) of the coating or film is less than 100 cc/m$^2$*day, preferably less than 10 cc/m$^2$*day measured at standard conditions (23° C., 50% RH), at a grammage of 10-50 g/m$^2$. In one embodiment of the present invention, the oxygen transmission rate (OTR) of the film is less than 200 cc/m$^2$*day, preferably less than 100 cc/m$^2$*day measured at 23° C., 80% RH, at a grammage of 10-50 g/m$^2$.

Preferably, the film or coating according to the present invention comprises at least 50 wt-% fiber material, based on the weight of dry film or coating, more preferably at least 60 wt-% fiber material, more preferably at least 70 wt-% fiber material.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3.), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregrates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the microfibrillated cellulose has a surface area of at least 30 $m^2$/g or more preferably more than 60 $m^2$/g or most pref.>90 $m^2$/g when determined according to nitrogen adsorption (BET) method for a solvent exchanged and freeze dried sample.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde, dialdehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The fibrillation may be carried out in the presence of wood bark or cork wood, such as in the presence of particles of the wood bark or cork wood or in the presence of at least one extractive, or a salt thereof, from wood bark or cork wood.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, ISO/TS 20477.

According to another embodiment, the suspension may comprise a mixture of different types of fibers, such as microfibrillated cellulose, and an amount of other types of fiber, such as kraft fibers, fines, reinforcement fibers, synthetic fibers, dissolving pulp, TMP or CTMP, PGW, etc.

The suspension may also comprise other process or functional additives, such as fillers, pigments, wet strength chemicals, retention chemicals, cross-linkers, softeners or plasticizers, adhesion primers, wetting agents, biocides, optical dyes, fluorescent whitening agents, de-foaming chemicals, hydrophobizing chemicals such as AKD, ASA, waxes, resins etc.

The papermaking machine that may be used in the process according to the present invention may be any conventional type of machine known to the skilled person used for the production of paper, paperboard, tissue or similar products.

The dewatering of the wet web according to the wet web can be carried out using methods known in the art. For example, the wet web may be provided on a wire, and be dewatered to form an intermediate thin substrate or film.

The dewatering on wire may be performed by using known techniques with single wire or twin wire system, frictionless dewatering, membrane-assisted dewatering, infrared dewatering, vacuum- or ultrasound assisted dewatering, etc. After the wire section, the wet web may be further dewatered and dried by mechanical pressing including shoe press, hot air, radiation drying, convection drying, etc.

The film can also be produced by applying said suspension to a non-permeable substrate to form a fibrous web and drying said web to form at least one layer of said film. The drying of said web may be done in any conventional way. The substrate can optionally be heated.

Optionally, wet pressing and/or contact drying can be used to remove moisture from the wet web.

According to one embodiment the wet web is dewatered by vacuum, i.e. water, and other liquids, is sucked from the furnish when it is placed on the wire.

The film according to the present invention can be heated, for example in a conventional household oven. The film may contain additives that improve the resistance to heat. Further, the film may contain additives such as salts and/or metal oxides to improve the fire or flame resistance of the film.

EXAMPLES

Materials used:
Suberin was extracted from bark using sodium hydroxide and 2-propanol using methods known in the art and used as a sodium salt in dry powder form herein.
Microfibrillated cellulose (MFC) was prepared using methods known in the art and used at 1% solid content.

Example 1

MFC was dispersed into cold water to obtain a final concentration of 1 (w/w). The mixture was stirred until MFC was completely dispersed and was gently heated on a heat block up to 40° C.

Suberin salt in dry powder form was added, under gentle stirring, into the warm suspension. The suberin salt was added in an amount of 15% (w/w) of the dry MFC weight.

Free films were prepared in plastic Petri dishes by pouring 18.2 g of the suspension into each Petri dish, resulting in a grammage of about 35 g/m².

With suberin, cracks in the film could be observed.

Example 2

MFC was dispersed into cold water to obtain a final concentration of 1 (w/w). The mixture was stirred until MFC was completely dispersed and was gently heated on a heat block up to 40° C.

Suberin salt in dry powder form was added, under gentle stirring, into the warm suspension. The suberin salt was added in an amount of 15% (w/w) of the dry MFC weight.

PVOH 6-88 or PVOH 15-99 (Poval, Kuraray, 15% w/w) was added to the suspension. Mixing was performed under vacuum in a desiccator to avoid air entrapment.

Free films were prepared in plastic Petri dishes by pouring 18.2 g of the suspension into each Petri dish, resulting in a grammage of about 35 g/m².

The films were allowed to dry and then stored at a controlled temperature and relative humidity (23±2° C., 50% RH) before further analysis.

With addition of PVOH 15-99, the films were almost spotless, smoother and generally less cracked. Small cracks however still existed.

Films with suberin and PVOH 6-88 had a similar smooth appearance to the ones with 15-99, but more cracks and small pinholes.

Reference films without suberin had no cracks (MFC and MFC+PVOH).

Oxygen transmission rate (OTR) and water vapor transmission rate (WVTR) was determined (ASTM F-1927 and ASTM F-1249, at the following climates: 23° C., 50% RH; 23° C., 80% RH; and 38° C., 90% RH) and the following results obtained:

| Sample | OTR 23/50 | OTR 23/80 | OTR 38/90 |
|---|---|---|---|
| SFA* + MFC | 2.4 and 2.0 | 65 and 57 | 674 and 725 |
| MFC ref | 0.6 and 0.8 | 37 and 35 | 375 and 513 |
| SFA + MFC + PVOH 15-99 | 0.4 and 0.4 | 49.4 and 45.4 | 688 and 896 |
| MFC + PVOH 15-99 ref | 0.6 and 0.6 | 33 and 31 | 468 and 659 |

SFA = suberin fatty acids

8

| Sample | WVTR 23/50 | WVTR 23/80 | WVTR 38/90 |
|---|---|---|---|
| SFA + MFC + PVOH 15-99 | 2.2 and 1.8 | 107 and 103 | 538 and 569 |
| MFC + PVOH 15-99 ref | 8.3 and 9.2 | 171 and 187 | 825 and 841 |

SFA = suberin fatty acids

Thus, the PVOH-containing films had better OTR than the ones without PVOH.

With the addition of suberin the oxygen barrier remained but had a higher oxygen transmission rate in all climates, except for in the PVOH variant at 23° C., 50% RH, where it was approximately the same.

The water vapor barrier was clearly improved by addition of suberin.

In view of the above detailed description of the present invention, other modifications and variations will become apparent to those skilled in the art. However, it should be apparent that such other modifications and variations may be effected without departing from the spirit and scope of the invention.

The invention claimed is:

1. A film or coating comprising:
a fiber material, wherein at least 60% by weight of said fiber material is microfibrillated cellulose;
at least 1% by weight of polyvinyl alcohol; and,
at least 5% by weight of at least one extractive, or a salt thereof, from wood bark or cork wood,
wherein each organic component of the film or coating present in amount greater than 1% by weight is biodegradable,
wherein a water vapor transmission rate of the film or coating, measured at a grammage of 10-50 g/m² and at 23° C. and 50% relative humidity, is less than 5 cc/m²*day.

2. The film or coating according to claim 1, wherein the polyvinyl alcohol has a degree of hydrolysis of at least 88 mol % and viscosity of at least 5 mPa·s in a 4% aqueous solution at 20° C. DIN 53015/JIS K 6726.

3. The film or coating according to claim 1, wherein the at least one extractive comprises suberin or a salt thereof.

4. The film or coating according to claim 1, wherein the film or coating is compostable, or biodegradable, or both.

5. The film or coating according to claim 1, wherein a thickness of the film or coating is from 0.05 to 100 μm.

6. The film according to claim 1, wherein said film is not part of a laminate or multi-layer structure.

7. The film or coating according to claim 1, wherein said film or coating is part of a laminate or multi-layer structure.

8. The film or coating according to claim 1, wherein the film or coating comprises at least 50 wt-% fiber material, based on a weight of a dry film or coating.

9. A multi-layer structure comprising:
a film or coating according to claim 1.

10. The multi-layer structure according to claim 9, further comprising:
at least one second layer or coating comprising a fiber material, wherein at least 60% by weight of said fiber material of the at least one second is microfibrillated cellulose, and wherein said fiber material of the at least one second is essentially free from extractive from wood bark or cork wood.

11. A packaging material comprising a film according to claim 1.

* * * * *